United States Patent [19]

Ishikawa et al.

[11] Patent Number: 5,052,988
[45] Date of Patent: Oct. 1, 1991

[54] DIFFERENTIAL CONTROL SYSTEM

[75] Inventors: Wataru Ishikawa, Davis; Andrew A. Frank, El Macero, both of Calif.; Brian Hamamoto, Belleville, Mich.

[73] Assignee: Aisin Aw Co., Ltd., Japan

[21] Appl. No.: 618,198

[22] Filed: Nov. 16, 1990

[51] Int. Cl.$^5$ .............................................. F16H 1/445
[52] U.S. Cl. .............................. 475/150; 192/84 PM; 192/84 E; 475/153
[58] Field of Search ................... 475/150, 153, 149; 192/84 PM, 84 E

[56] References Cited

U.S. PATENT DOCUMENTS

4,718,303  1/1988  Fogelberg ........................... 74/710.5

Primary Examiner—Dirk Wright
Attorney, Agent, or Firm—Lorusso & Loud

[57] ABSTRACT

A conductor which is coupled to a rotatably supported first shaft and a magnetic field generating device which is coupled to a rotatably supported second shaft are rotatable relative to each other. A relative position changing device for changing the relative position between the conductor and the magnetic field generating device is provided therebetween, and a torque splitting device is provided between the first and second shafts. The degree at which the conductor cuts across the magnetic flux in the magnetic field is changed by means of the relative position changing device. The input torque is distributed between the first and second shafts by the torque splitting device. The torque splitting device includes multiplying gear unit provided between the first shaft and the conductor. If the torque splitting device is a planetary gear unit, the initial setting of torque distribution is easy. A lock-up clutch is provided between the conductor and the magnetic field generating device.

10 Claims, 8 Drawing Sheets

DIFFERENTIAL CONTROL SYSTEM

BACKGROUND OF THE INVENTION

1. Field of the Invention

The present invention relates to a differential control system for use in a 4-wheel drive vehicle.

2. Description of the Related Art

Front wheel drive vehicles exhibit more stability than rear wheel drive vehicles when the vehicles travel straight ahead. However, front wheel drive vehicles provide poor cornering because the tires must be maintained at a large angle due to the loss of front wheel cornering power. The rear wheel drive vehicles exhibit excellent cornering. However, they are susceptible to oversteering during cornering.

Thus, the ideal running of a vehicle is with front and rear axles driven be an equal force. From this viewpoint, 4-wheel drive vehicles are excellent because the engine torque is continuously distributed between front and rear axles by means of a central differential device.

In the 4-wheel drive vehicle, the engine torque is first transferred to the central differential device which is a gear unit including a pinion gear and right and left side gears or a planetary gear unit. The central differential device splits the engine torque into two fractions. One of the torque fractions is transferred from the central differential device to the front axle differential device where it is distributed again to the right and left side gears. The distributed torques are then transferred to the right and left front axles. The other fraction is transferred through a propeller shaft to a rear axle differential device where it is distributed again to the right and left side gears. The distributed torques are then transferred to the right and left rear axles.

When the engine torque is split between front and rear differentials by the central differential device, the so-called tight corner braking phenomenon is prevented, which would otherwise occur due to different angular rates for each wheel during tight cornering on a road having a high frictional coefficient, while the torque transfer limit values during cornering increase. Maximum traction occurs when equal torque drives the front and rear wheels.

However, in the 4-wheel drive vehicle which incorporates a central differential device, when one of the four wheels slips on a snowy or frozen road and no load is applied thereto, drive energy escapes through that one wheel by the operation of the central differential device, causing power loss.

Hence, a differential limiting mechanism for suspending the operation of the central differential device is provided. The differential limiting mechanism includes a wet multiple disk friction clutch and a hydraulic actuator.

In a normal running, the multiple disk friction clutch is disengaged, and the central differential device is maintained in an operational state to split the torque between front and rear axles. When the vehicle travels on a road which is covered with snow or on a frozen road, the clutch is engaged to suspend the operation of the central differential device.

The slip limit characteristics of the tires are determined by a load applied perpendicular to the surface of the tire at the point where it makes contact with the ground, and the slip limit characteristics vary in accordance with distribution of the weight of the vehicle. However, drive train wind-up develops in rigid 4-wheel drive transmissions with the above-described conventional clutch locked-up central differential device, causing power loss in the torque transmission system and increased wear of the clutch and gear components.

In the clutch open mode, the center differential is initially efficient in the transfer of torque; however, as torque further increases, either the front or rear wheels slip first, preventing further transfer of the torque. In other words, the torque transfer limit is determined by the lower torque value of the front or rear wheels. For example, one of the front wheels slips, the torque of the rear wheels also reduces immediately, and this prevents sufficient driving force from being transferred to the road surface.

In answer to the foregoing problem, Japanese Patent Laid-Open No. 176728/1988 discloses a system in which a differential limiting clutch is provided parallel to the central differential device and in which engagement of the differential limiting clutch is limited by an electronic control unit so as to achieve increase in the slip limiting characteristics of the tires and increase in climbing ability, traction and running stability on a snowy road or the like. Such a differential system that continuously varies the torque distribution responsive to traction requirements and optimal fuel economy would improve vehicle performance and offer more safety to the driver. However, the differential limiting clutch employed in the above-described differential control system suffers from problems associated with wear and, after an extended period, fails to provide sufficient differential limiting.

SUMMARY OF THE INVENTION

An object of the present invention is to provide a torque control system which is capable of eliminating the aforementioned problem of the conventional differential control system and which therefore provides sufficient torque control over and extended, lengthy period of time.

To this end, the present invention provides a novel differential control unit which includes a rotatably supported first shaft which carries a conductor rotatable therewith and a rotatably supported second shaft which carries a magnetic field generating device rotatable therewith. The conductor and the magnetic field generating device are arranged such that they are rotatable relative to each other while magnetically engaged.

The novel differential control unit further includes a relative position changing device for changing the relative position between the conductor and the magnetic field generating device. As the degree with which the conductor cuts across the magnetic flux in the magnetic fields changes by the operation of the relative position changing device, eddy current is varied, thereby generating a variable resistance torque.

A torque splitting and speed increasing device is disposed between the first and second shafts. The torque splitting and speed increasing device distributes the resistance torque between the first and second shafts, the input torque and the output torque.

In the preferred embodiments the conductor includes a cup member, the magnetic field generating device is a housing which surrounds the conductor and the relative position changing device is a position control servomotor. In this way, torque distribution can be efficiently controlled.

The torque splitting and speed increasing device is disposed between the first shaft and the cup member to amplify the distributed torque. This allows the overall size of the differential control unit to be reduced. In the preferred embodiments the torque splitting and speed increasing device is a planetary gear unit.

A lock-up device for preventing relative rotation between the conductor and the magnetic field generating device is provided to increase the maximum value of the torque transferred and to provide lockup capability for ice and snow conditions.

BRIEF DESCRIPTION OF THE DRAWINGS

The structure and features of the differential control unit according to the present invention will now be described with reference to the accompanying drawings wherein.

DESCRIPTION OF THE PREFERRED EMBODIMENTS

The differential control unit according to the present invention employs a magnetic-mechanical coupler as a torque control mechanism to distribute engine torque between a vehicle's front and rear axles.

The magnetic-mechanical coupler operates when an aluminum cup, acting as the conductor, is rotated inside of a stationary magnetic field generated by a magnetic field generating device. The relative motion of the conductor and magnetic field creates an electric motive force (EMF) in the conductor. This induced EMF causes free electrons to circulate as eddy currents throughout the aluminum cup. By Lenz's Law, the direction of these eddy currents must oppose the change that causes them.

Thus, the aluminum cup encounters rotational resistance as it spins inside the magnetic field. As relative speed is increased or the cup's depth into the magnetic field is increased, the aluminum cup cuts across more magnetic flux, and more eddy currents develop.

The magnitude of the rotational resistance generated at that time depends on the size of the aluminum cup and the magnitude of the magnetic field, and ranges from 0 to 1 ft-lbs in the case of the magnetic-mechanical coupler which is employed in the differential control unit according to the present invention. In a case where the magnetic-mechanical coupler is employed to distribute engine torque of a 4-wheel drive vehicle between front and rear axles, a gear box which includes a planetary gear unit is therefore incorporated in order to amplify the rotational resistance.

The gear box is used in a power split configuration to control torque from zero to 300 ft-lbs. and the magnetic-mechanical coupler can control torque from zero to 60 ft-lbs, in the eddy current effect range.

Also, a friction element for increasing torque and locking up the aluminum cup and thereby eliminating relative rotation in the magnetic-mechanical coupler is provided. The friction element is capable of controlling a torque in a range from 60 to 300 ft-lbs. When the vehicle travels on a snowy or frozen road, i.e. for "off road", or for occasional emergency conditions, maximum torque is transmitted by locking up the magnetic-mechanical coupler.

Figure 1:
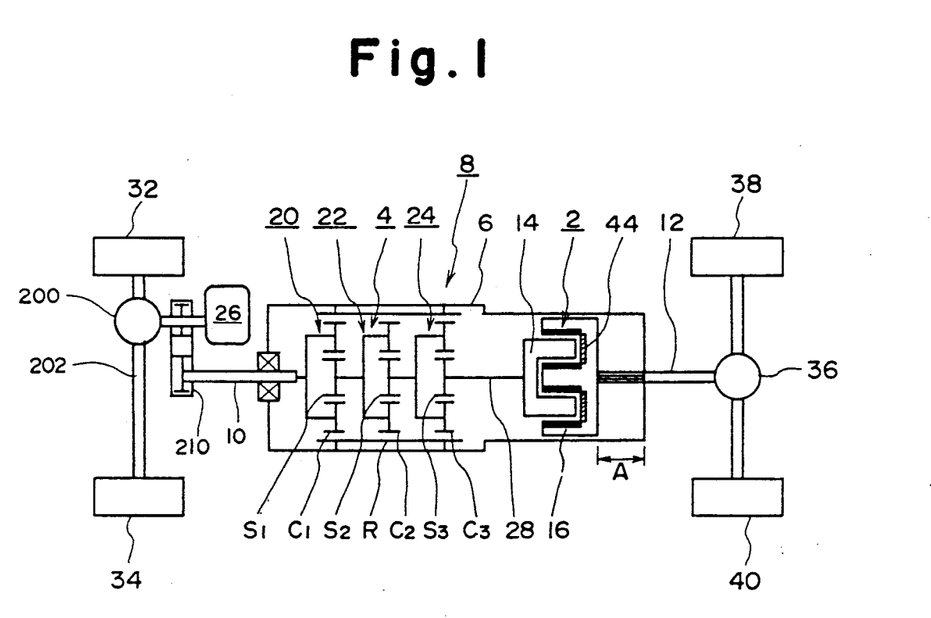
FIG. 1 is a schematic view of a vehicle drive train including a preferred embodiment of the differential control unit according to the present invention.

FIG. 1 depicts a vehicle drive train inclusive of the novel differential control unit 8 of the present invention. The drive train depicted in FIG. 1 further includes an engine and transmission unit 26 a front wheel differential 200 and a central differential 210 and a rear differential 36, all of which are conventional to standard 4-wheel drive vehicles. As in a standard 4-wheel drive vehicle, the central differential 210, which may be either a chain or a gear mechanism, serves to distribute the torque received from the engine/transmission 26 to the front differential 200 and rear differential 36 at equal speed. In the embodiment illustrated in FIG. 1 the novel differential control unit 8 replaces the differential limiting clutch of the aforementioned prior art system.

Referring to FIG. 1, a magnetic-mechanical coupler unit 2 and a gear box 4 are housed in a coupling/gear box casing 6 and together form the novel differential control unit 8 of the present invention. The entire differential control unit 8 rotates along with front and rear shafts 10 and 12. The magnetic-mechanical coupler unit 2 includes an aluminum cup 14 and a magnetic housing 16 disposed in opposed relation to and in such a manner as to be rotatable relative to the aluminum cup 14. The coupling/gear box casing 6 is rigidly connected to the rear shaft 12 and rotates along with the magnetic housing 16.

Figure 5:
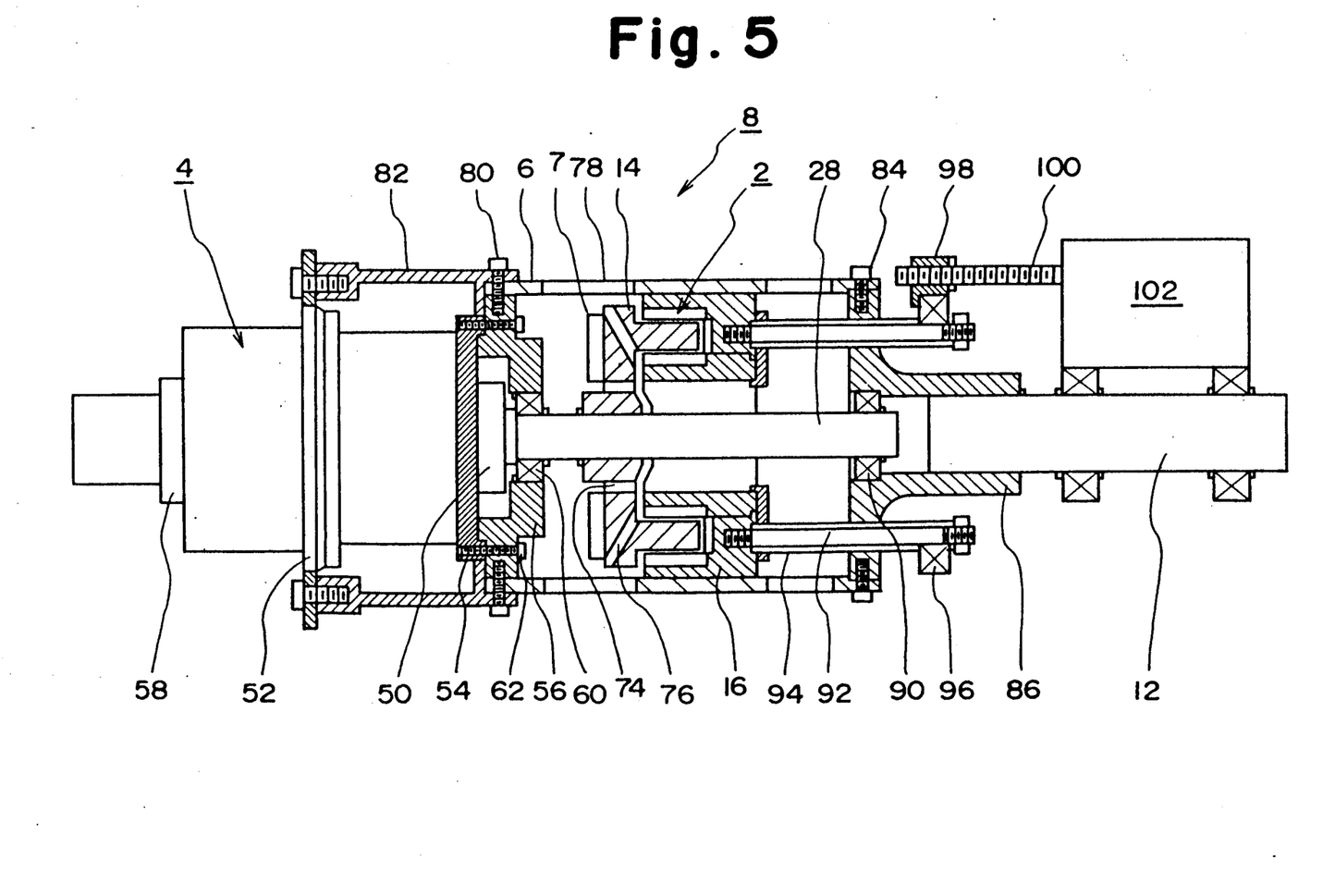
FIG. 5 is a cross-section of the magnetic-mechanical coupler unit included in the embodiment of FIG. 1.

The magnetic housing 16 can move axially in the direction indicated by the arrows A relative to the coupling/gear box casing 6 and the rear drive shaft 12, by which the position of the aluminum cup 14 within magnetic housing 16 can be adjusted. This movement of the magnetic housing 16 relative to the aluminum cup 14 is performed by a relative position changing unit including screw 100 and servomotor 102 as shown in FIG. 5.

As shown in FIG. 1, the gear box 4 includes a first planetary gear unit 20, a second planetary gear unit 22 and a third planetary gear unit 24. The planetary gear units 20, 22 and 24 have a common ring gear R through which a first sun gear S1, a first carrier C1, a second sun gear S2, a second carrier C2, a third sun gear S3, and a third carrier C3 are disposed in engagement.

The output of an engine and transmission unit 26 is transferred to the front shaft 10 of the differential control unit 8 via the central differential a10. Front shaft 10 is coupled to the first carrier C1, the first sun gear S1 is coupled to the second carrier C2, the second sun gear S2 is connected to the third carrier C3, and the third sun gear S3 is coupled to the aluminum cup 14 through an intermediate shaft 28. In the case of the gear unit 4 incorporated in the differential control unit 8 according to the present invention, the gear ratio of the planetary gear units 20, 22 and 24 is set such that one revolution of the front wheel axle 10 is increased to 60 revolutions of the aluminum cup if the rear axle shaft is stationary.

As a consequence, rotation, which is generated by an engine and which is increased or reduced by a transmission, is input to the planetary gear units 20, 22 and 24 through the front shaft 10. The speed of rotation of shaft 10 is increased by gear unit 4, and the increased rotation is input to the aluminum cup 14 through the intermediate shaft 28, which is the output shaft of the gear box 4, where it is distributed between the front and rear wheels. The torque which is distributed to the front wheels by the magnetic-mechanical coupler unit 2 is output through the front wheel drive axle 10 to the front wheel differential device 200 where it is distributed between front wheels 32 and 34. The torque which is output through the rear wheel drive axle 12 is distributed between rear wheels 38 and 40 by a rear wheel differential device 36.

In most vehicles, due to inconsistencies in tire radii, pressures, characteristics, weight distribution, drive line compliance and road conditions, a small speed difference develops between the front and rear drive shafts. Assuming that the speed difference between the front and rear shafts 10 and 12 is $\Delta W$, relative motion between the aluminum cup and the magnetic housing 16, which is equal to $[60 \cdot \Delta W]$, is generated due to the operation of the gear box 4.

The magnetic housing 16, whose longitudinal position is controlled by a servomotor 102 (see FIG. 5), engulfs the aluminum cup 14. As the depth of the aluminum cup 14 into the magnetic housing 16 increases, more eddy currents develop thus creating more resistance to the relative rotation between the magnetic housing 16 and the aluminum cup 14. Since the aluminum cup 14 is coupled to the gear box 4 through the intermediate shaft 28, the total resistance which is transmitted to the intermediate shaft 28 is amplified 60 times by the gear box 4 and then transferred out to the coupling/gear box casing 6.

One important characteristic of the mechanical-magnetic coupler unit 2 is its lock-up capabilities.

More specifically, a clutch pad 44 is adhered to the bottom of the magnetic housing 16 at a position facing the aluminum cup 14. When the cup 14 reaches the bottom of the magnetic housing it presses against the clutch pad 44 and thereby establishes lock-up. If more torque than can be supplied by the eddy current coupling between the front and rear axles is desired, the servomotor moves the magnetic housing towards the cup until it contacts the clutch pad 44.

Since lock-up requires that the magnetic housing 16 be brought into contact with the aluminum cup 14 with sufficient force, a position signal overrides the servomotor control system. Since the magnetic housing can no longer move after lock-up, the error signal between the commanded position and from a linear feedback potentiometer increases. As the error increases, the servomotor receives more current which increases its torque. Thus the clutch force can be controlled by the control voltage. The error voltage can be increased until no slip occurs between the magnetic housing 16 and aluminum cup 14.

With lock-up the cup has no motion relative to magnetic housing 16 and the entire coupling/gear box casing 6 rotates along with the front and rear shafts 10 and 12. Since the gear box 4 amplifies the control torque by 60, only 5 ft-lbs pressing against the clutch pad 44 is necessary to generate 300 ft-lbs for transfer to the rear differential during lock-up. The differential control unit then has no loss and becomes 100% efficient in torque transmission.

Figure 2:
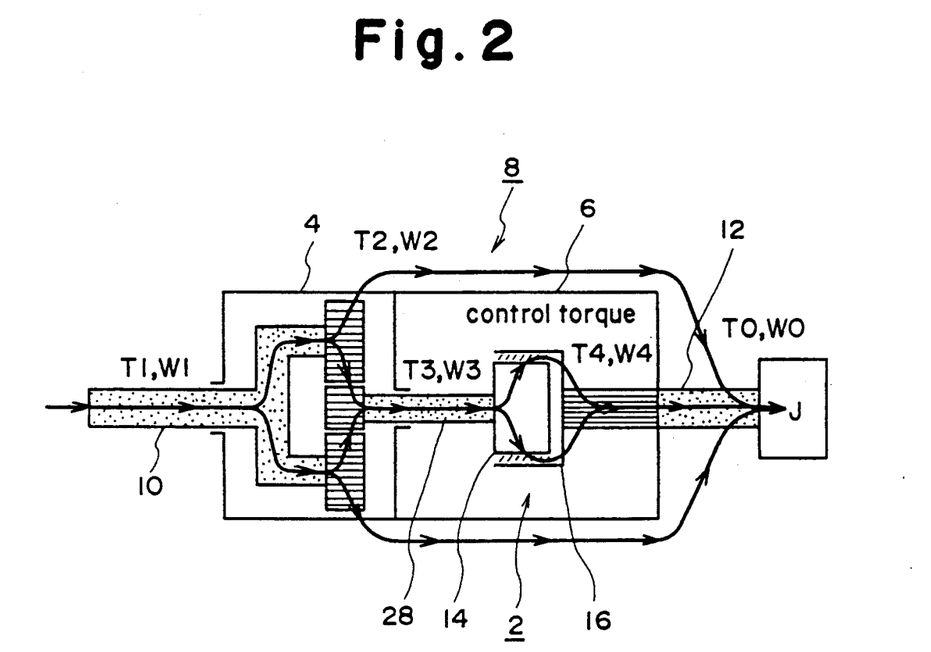
FIG. 2 is a power flow diagram, showing power transfer between input and output shafts in the differential control unit of the embodiment of FIG. 1.

FIG. 2 shows the power flow diagram between input and output shafts of the differential control unit 8. The meanings of the various symbols used in FIG. 2 are as follows:

W1: front wheel drive axle speed (rpm), i.e. speed of rotation which is generated by an engine 26 and which is increased or reduced by a transmission.

W2: gear box casing angular speed (rpm).

Jc: rotation inertia of the cup 14 (kg·m·m)

J: inertia of the car (kg·m·m)

Torque enters the input shaft 10 from the vehicle's engine and front drive mechanism and the central differential 210. The amount of torque T1 which enters is determined by the control torque T4 and residual resistances in the differential control unit 8. The torque due to residual resistances is small and immediately travels through the coupling 2 and gear box casing 6 to the output shaft 12.

The majority of the entering torque T1 is split at the gear box 4 into torques, T2 and T3. The torque T3 travels to the aluminum cup 14. Because the gear box ratio equals to 60:1, the torque T3 at the intermediate shaft 28 is actually 1/60 of the torque T1. The torque T3 travels through the magnetic housing 16 to the output shaft 12 due to electromagnetic resistance. A large amount of torque T2 is transmitted through the gear box casing 6 to the output shaft 12. The torque T2 is combined with the torque T4 at the output shaft 12 to form the output torque T0.

When lock-up of the magnetic-mechanical coupler unit 2 occurs, all input torque T1 travels through the coupling 2 and gear box casing 6 to the output shaft 12.

Figure 3:
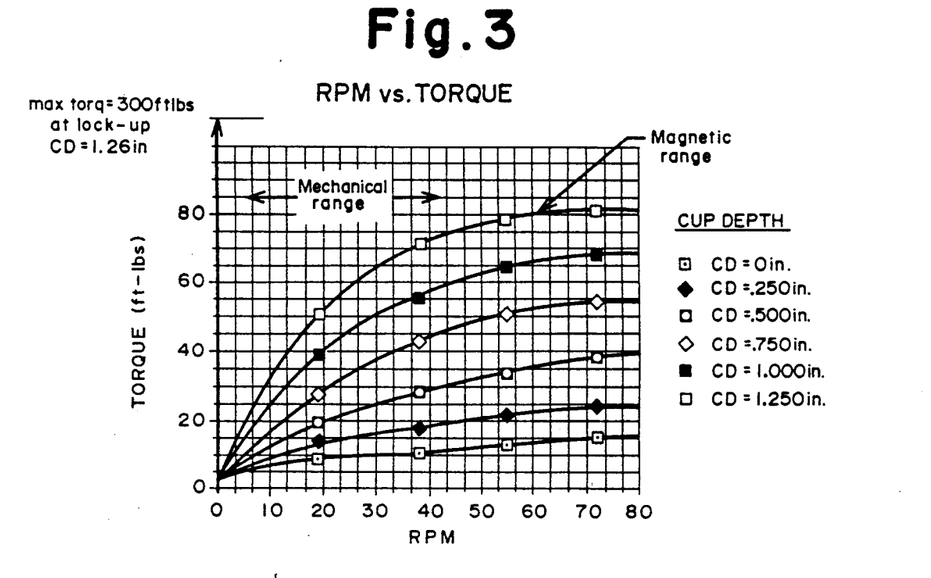
FIG. 3 is a graph showing the relation between RPM and torque in the differential control unit of FIG. 1.
Figure 4:
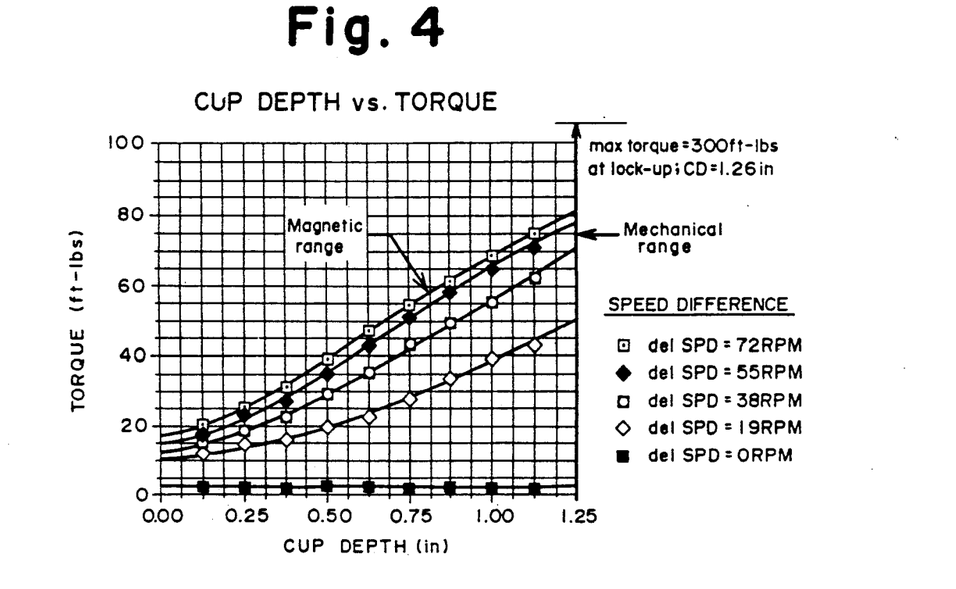
FIG. 4 is a graph showing the relation between cup depth and torque in the differential control unit of FIG. 1.

FIG. 3 illustrates the relationship between the relative rotation and torque in the differential control unit according to the present invention, and FIG. 4 illustrates the relation between the cup depth and torque in the differential control unit according to the present invention.

The amount of engine torque transferred to the rear shaft 12 by the differential control unit 8 is a function of the depth to which the aluminum cup 14 is inserted within the magnetic housing 16, i.e. the cup depth, and the speed difference between the front and rear shafts 10 and 12. Although both factors are variable, only the cup depth is controllable. The speed difference changes with road conditions and vehicle parameters.

In the graph shown in FIG. 3, different cup depths are plotted on a speed difference vs. torque grid.

The graph shows a non-linear relationship between speed difference and transmitted torque. At low rpm speed difference (ranging from 10 to 30 rpm), the curves increase rapidly, then level off at higher rpm.

In the lock-up mode, the speed difference equals .0 and the torque transmitted is the maximum rating of the gear box (300 ft-lbs). It is possible to control the transmitted torque in the mechanical friction range. The coupling then has two modes of operation. If the eddy current effect is insufficient, the friction mode can produce the desired torque.

In the cup depth vs. torque graph shown in FIG. 4, four discrete speed differences are plotted on a cup depth vs. torque grid. The curves are essentially linear after a cup depth of 0.25 in. When lock-up occurs, the curves converge and increase rapidly to the maximum torque transmitted.

FIG. 5 is a cross-section of the differential control unit according to the present invention.

The differential control unit 8 includes the gear box 4, and the magnetic-mechanical coupler unit 2. The gear box 4 has a cylindrical shape. The gear box 4 incorporates three planetary gear sets which provide a gear ratio of 60:1 between the input shaft and the output shaft, i.e. which increase the relative rotation between the front shaft 10 and the rear shaft 12 by 60 times. The increased rotation is output to an intermediate shaft 28 through a sun gear interface 50. The gear box 4 has a central flange 52 and an end flange 54. Near the flange 54 is disposed a gear box interface 56 which, together with the gear box 4, rotatably supports the planetary gear sets through bearings 58 and 60. The gear box 4 and the gear box interface 56 are connected to each other by means of bolts 62.

Figure 6:
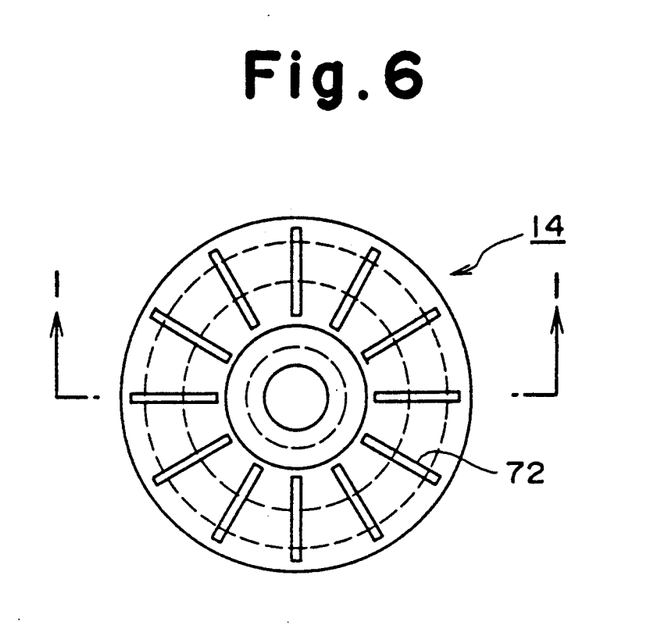
FIG. 6 is a plan view of the aluminum cup of the coupler unit of FIG. 5.
Figure 7:
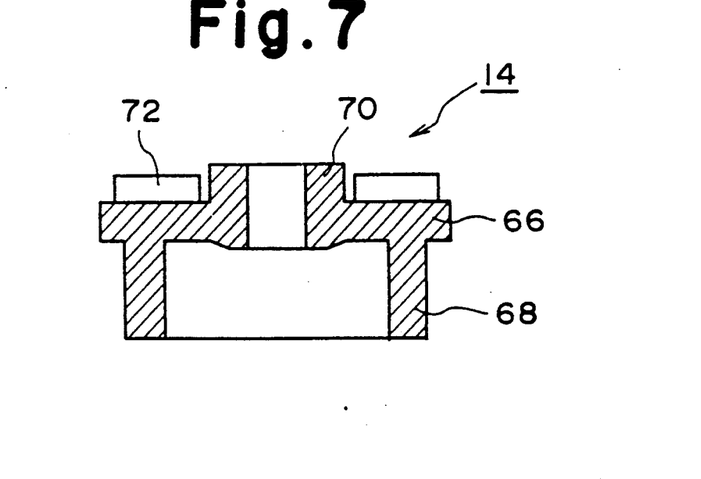
FIG. 7 is a section taken along the line B—B of FIG. 6.

The rotation which is increased by the gear box 4 is transferred to aluminum cup 14 through the intermediate shaft 28. The aluminum cup 14 is made from 2024 alloy aluminum. The cup 14 includes a bottom portion 66, a cylindrical portion 68 and a boss portion 70, as shown in FIGS. 6 and 7. To dissipate heat caused by the eddy currents and to provide additional heat caused by the eddy currents and to provide additional torque capacity, twelve fins 72 are attached to the bottom portion 66 in a radial fashion to provide more surface area for convection heat transfer and to pump air through the cup during the rotation thereof. Air passages 74 and 76 may be formed in the bottom portion 66 of the aluminum cup 14, as shown in FIG. 5, to provide efficient circulation of air. To discharge the heat emanating from the aluminum cup 14 out of the differential control system 8, an air vent 78 is formed in the coupling/gear box casing 6 at a position which faces the aluminum cup 14. While heat dissipation is a major problem in most coupling systems, it is solved by this simple technique in this system.

One end of the coupling/gear box casing 6 is fixed to the gear box interface 56 and connected to a casing connector 82 by means of bolts 80. The other end of the casing connector 82 is fixed to the flange 52 of the gear box 4.

The other end of the coupling/gear box casing 6 supports a rear wheel drive shaft interface 86 through bolts 84. The rear wheel drive shaft interface 86, which is coupled to the rear wheel drive shaft 12, rotatably supports the intermediate shaft 28 through a bearing 90.

The coupling/gear box casing 6 also supports the magnetic housing 16 for sliding movement relative to the housing 16. The position of the magnetic housing relative to the aluminum cup 14 is changed in order to obtain a desired cup depth.

To obtain a desired cup depth, studs 92 are fixed to the end surface of the magnetic housing 16. The studs 92 are slidably supported by the rear wheel drive shaft interface 86 through aluminum tubes 94. The other ends of the studs 92 are rotatably supported by a bearing claim 98 through a bearing 96.

The servo system uses a DC servomotor 102 with a lead screw 100 to control the position of the magnetic housing. As the DC servomotor 102 rotates, the lead screw 100 rotates and thereby moves the bearing clamp 98 to the right and left as viewed in FIG. 5. The movement of the bearing clamp 98 is transferred to the magnetic housing 16 through the studs 92. A linear potentiometer is connected to the DC servomotor 102 to provide cup position feedback. The position of the cup determines the torque transmitted as shown in FIGS. 3 and 4.

Figure 8:
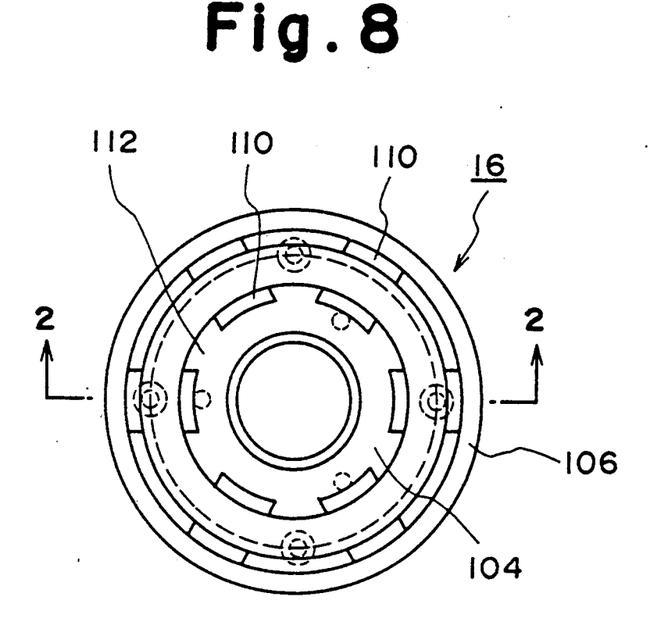
FIG. 8 is a plan view of the magnetic housing of the coupler unit FIG. 5.
Figure 9:
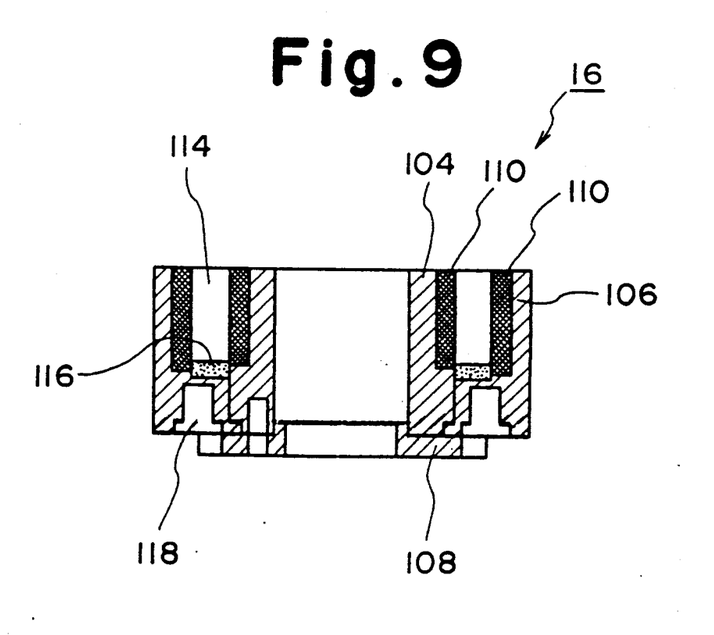
FIG. 9 is a taken along the line C—C of FIG. 8.

As shown in FIGS. 8 and 9, the magnetic housing 16 includes a cylindrical inner magnet portion 104, an outer magnet portion 106 and a bottom portion 108. Twelve rare earth magnets 110 are imbedded in both the outer peripheral surface of the inner magnetic portion 104 and in the inner peripheral surface of the outer magnet portion 106 at 6 positions to form magnetic fields. Adjusting pins are disposed on the outer peripheral surface of the inner magnet portion 104.

A circular cup housing chamber 114 is formed between the inner magnet portion 104 and the outer magnet portion 106 to house the aluminum cup 14. As the magnetic housing 16 is moved longitudinally, the cup depth is thereby adjusted.

A clutch pad 116 is disposed at the bottom of the circular cup housing chamber 114. Contact of the end surface of the cylindrical portion 68 of the aluminum cup 14 with the clutch pad 116 generates friction between the aluminum cup and the magnetic housing 16 which is sufficient to eliminate relative rotation therebetween.

Screw holes 118 for fixing the studs 92 are provided at the bottom of the magnetic housing 16.

Next, the torque split operation of the differential control unit 8 of the present invention will be described in detail with reference to FIGS. 10 to 12.

Figure 10:
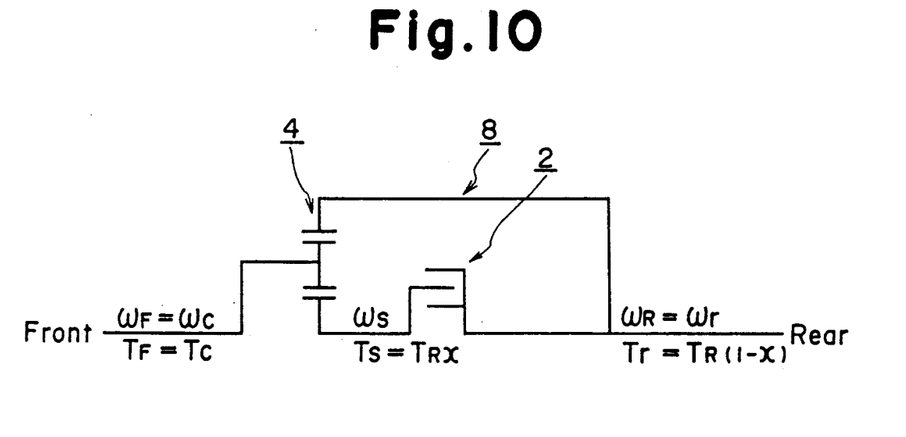
FIG. 10 illustrates the torque spitting mechanism of the coupler unit of FIG. 5.
Figure 11:
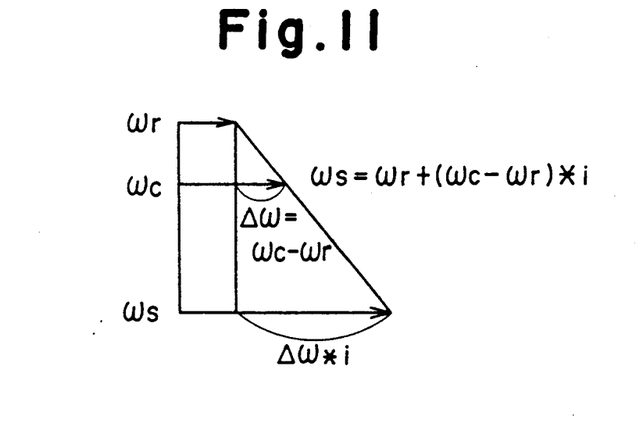
FIG. 11 illustrates rotational speed control according to the present invention.
Figure 12:
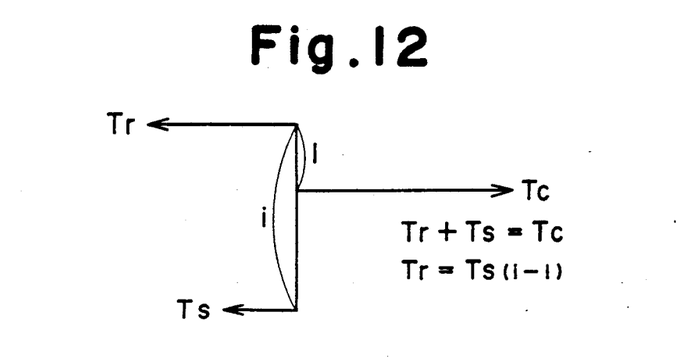
FIG. 12 illustrates torque transfer in the differential control unit according to the present invention.

In FIGS. 10 to 12, the gear box 4 is represented by a one-stage planetary gear unit.

Where $\omega F$ is the rotational speed of the front shaft, $\omega R$ is the rotational speed of the rear shaft, and $\omega s$, $\omega c$, and $\omega r$ are respectively rotational speeds of the sun gear, carrier and ring gear of the gear box 4.

$$\omega f = \omega c$$

$$\omega R = \omega r$$

Where is the rotational speed multiplier (speed increase ratio) of the gear box 4, $$\omega s = \omega r + (\omega c - \omega r) \cdot i.$$

Furthermore, where $\Delta \omega = \omega e - \omega r$ $$\omega s = \omega r + (\omega c - \omega r) \cdot i$$

If the multiplier i is 60, the input shaft (front shaft 10) is multiplied 60 times.

Where $T_F$ is the front shaft torque, $T_R$ is the rear shaft torque, $T_s$, $T_c$ and $T_r$ are respectively torques at the sun gear, carrier and ring gear of the gear box 4, and x is the torque distribution ratio, $$T_F = T_c$$

$$T_R = T_s + T_r$$

$$T_s = T_R \cdot X, \quad T_r = T_s(i-1)$$

Since $$x = i^l$$

if the multiplier i is 60, $$x = 0.017$$

This means that the magnetic-mechanical coupler unit 2 bears only 1.7% of the transmitted torque.

When the differential control unit according to the present invention is installed in a vehicle, a computer will control operation of the magnetic-mechanical coupler unit.

A computer will determine the absolute engine torque, depending on throttle position δ and engine speed, then depending on the torque split dial setting from the driver, it will calculate the necessary torque transfer to the rear axle via the rear shaft 12. With this value and the measured speed differential data acquired through speed sensors on the wheels, the computer will instruct the servo control to position the magnetic housing for the desired torque transfer to the rear axle.

Figure 13:
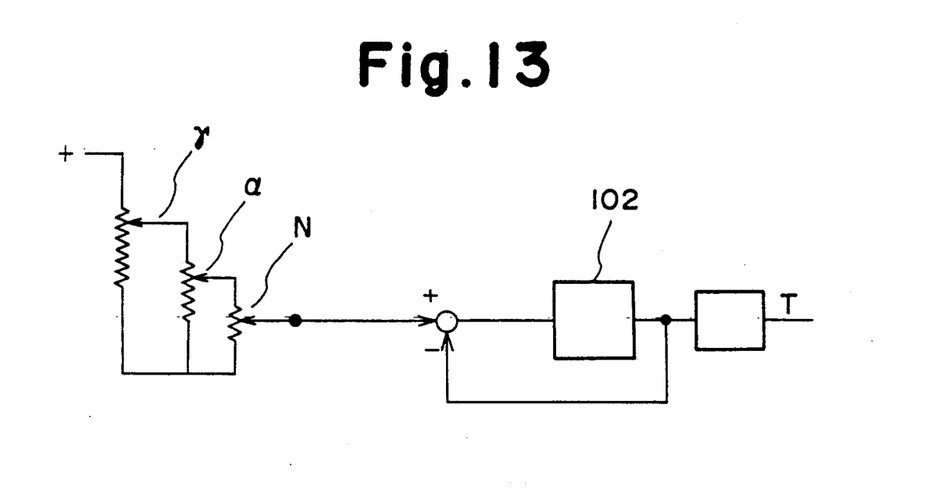
FIG. 13 is a block diagram illustrating control of the magnetic couple in the coupler unit of FIG. 5.
Figure 14:
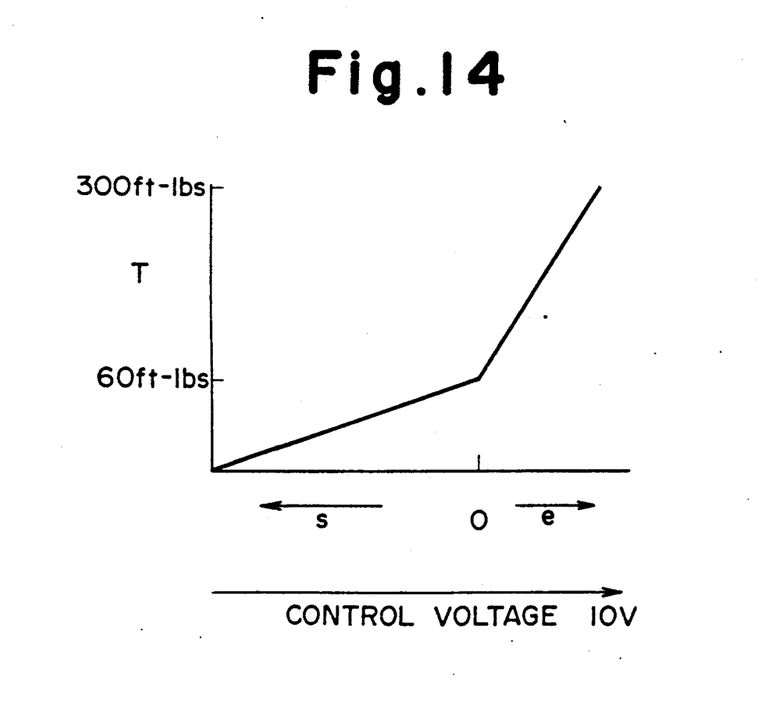
FIG. 14 shows the relationship between the control voltage applied to a servomotor and the transmitted torque in the control system of FIG. 13.

As shown in FIG. 13, once the distribution ratio γ is set at which the engine torque is to be split, the throttle position δ and the gear range N are set, the DC servomotor 102 is feedback controlled to output torque T. At that time, as the voltage applied to the servomotor 102 increases, as shown in FIG. 14, the space S between the aluminum cup 14 and the magnetic housing 16 decreases and the cup depth therefore increases. As the control voltage further increases after the space S has reached 0, an error signal e increases.

If the vehicle transmission gear ration or throttle setting or speed differential changes, the servo control will compensate for it by repositioning the housing.

Thus, the differential control system will keep the torque properly divided between front and rear axles at all times depending on a driver controlled dial setting.

While the present invention has been described with respect to what is presently considered to be the preferred embodiment, it is to be understood that the invention is not limited to the disclosed embodiment. The present invention is intended to cover carious modifications and equivalent arrangements included within the spirit and scope of the appended claims.

What is claimed is:

1. A differential control system comprising:
   (a) input means for receiving an input torque T1 at a first rotational speed W1;
   (b) a rotatably supported first shaft;
   (c) a conductor coupled to the first shaft, said conductor being rotatable together with the first shaft;
   (d) a rotatably supported second shaft;
   (e) magnetic field generating means, coupled to the second shaft, for generating an electric field around said conductor thereby establishing a magnet couple between said first and second shafts, said first shaft driving said second shaft through said magnetic couple with a torque T4;
   (f) relative position changing means for changing relative position between the conductor and the magnetic field generating means and thereby changing said torque T4;
   (g) torque splitting means, disposed between the first and second shafts, for splitting said input torque T1 into a torque T3 driving said first shaft and a torque T2 driving said second shaft.

2. A differential control system according to claim 1, further comprising an air cooling device to dissipate heat generated by said system.

3. A differential control system according to claim 1, wherein said conductor comprises a cup member, wherein said magnetic field generating means comprises a housing which surrounds the conductor, and wherein said relative position change means comprises a servomotor.

4. A differential control system according to claim 3, wherein said torque splitting means includes speed increasing means, disposed between said input means and said first shaft, for multiplying said first rotational speed W1, thereby driving said first and second shafts at speeds in excess of W1.

5. A differential control system according to claim 4, wherein said torque splitting device comprises a planetary gear unit.

6. A differential control system according to claim 1, further comprising lock-up means for eliminating relative rotation between said conductor and said magnetic field generating means.

7. A differential control system according to claim 1 wherein said torque splitting means comprises a planetary gear unit and a casing housing said planetary gear unit, said cup member and said housing, said casing being rigidly connected to said shaft for rotation with said second shaft, whereby torque is transferred from said input means to said second shaft through said first shaft as said T4 and through said casing as said T2.

8. A differential control system according to claim 4 wherein said spread increasing means comprises a planetary gear unit and a casing housing said planetary gear unit, said cup member and said housing, said casing being rigidly connected to said second shaft for rotation with said second shaft, whereby torque is transferred from said input means to said second shaft through said first shaft as said T4 and through said casing as said T2.

9. A differential control system in accordance with claim 1 wherein said conductor is in the form of an open-ended cup and said magnetic field generating means includes a housing comprising inner and outer magnetic cylindrical members connected by a bottom portion, said inner and outer cylindrical members being spaced apart to define an annular space therebetween for receiving the open end of said cup.

10. A differential control system in accordance with claim 9 further comprising lock-up means for eliminating relative rotation between said conductor and said magnetic field generating means, said lock-up means comprising a clutch pad mounted on said bottom portion within said annular space.

* * * * *

UNITED STATES PATENT AND TRADEMARK OFFICE
CERTIFICATE OF CORRECTION

PATENT NO. : 5,052,988
DATED : October 1, 1991
INVENTOR(S) : ISHIKAWA et al

It is certified that error appears in the above-identified patent and that said Letters Patent is hereby corrected as shown below:

Col. 1, line 18, delete "be" insert --by--.

Col. 3, line 37, after "a" insert --section--.

Col. 9, line 7, "x=i¹" should read --x=$\frac{1}{i}$--;

line 49, "carious" should read --various--.

Signed and Sealed this

Ninth Day of November, 1993

Attest:

BRUCE LEHMAN

Attesting Officer  Commissioner of Patents and Trademarks